US012205517B2

(12) United States Patent
Luo et al.

(10) Patent No.: US 12,205,517 B2
(45) Date of Patent: Jan. 21, 2025

(54) LED DRIVING CIRCUIT, LED DISPLAY SYSTEM AND DISPLAY CONTROL METHOD

(71) Applicant: HANGZHOU SHIXIN TECHNOLOGY CO., LTD, Hangzhou (CN)

(72) Inventors: Zheng Luo, Hangzhou (CN); Jiandong Zhao, Hangzhou (CN)

(73) Assignee: HANGZHOU SHIXIN TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 18/275,472

(22) PCT Filed: Mar. 25, 2022

(86) PCT No.: PCT/CN2022/082999
§ 371 (c)(1),
(2) Date: Aug. 2, 2023

(87) PCT Pub. No.: WO2022/218129
PCT Pub. Date: Oct. 20, 2022

(65) Prior Publication Data
US 2024/0087500 A1 Mar. 14, 2024

(30) Foreign Application Priority Data
Apr. 14, 2021 (CN) ......................... 202110402096.4

(51) Int. Cl.
*G09G 3/20* (2006.01)
*G09G 3/32* (2016.01)

(52) U.S. Cl.
CPC ............ *G09G 3/2096* (2013.01); *G09G 3/32* (2013.01); *G09G 2330/021* (2013.01)

(58) Field of Classification Search
CPC .. G09G 3/2096; G09G 3/32; G09G 2330/021; G09G 3/2085; G09G 3/2099;
(Continued)

(56) References Cited

U.S. PATENT DOCUMENTS 11,348,535 B2 5/2022 Liao et al.
2004/0100459 A1 5/2004 Wu et al.
(Continued)

FOREIGN PATENT DOCUMENTS

CN 101039539 A 9/2007
CN 101339738 A 1/2009
(Continued)

OTHER PUBLICATIONS

International Search Report (including English translation) and Written Opinion for International Application No. PCT/CN2022/082999, dated Jun. 13, 2022, 11 pages.
(Continued)

*Primary Examiner* — Stephen G Sherman
(74) *Attorney, Agent, or Firm* — Westman, Champlin & Koehler, P.A.

(57) ABSTRACT

A display control method for an LED display system, an LED driving circuit and an LED display system are provided. The display control method includes: receiving a data signal that includes at least transmission identification and display data and a clock signal; controlling serial transmission of the clock signal according to the transmission identification in each of a plurality of groups of cascaded LED driving circuits. The disclosure determines transmission identification of a next display cycle according to display data of a current display cycle and display data of the next display cycle, and turn on or off transmission of a clock signal in the current display cycle in accordance with the transmission identification. When the control terminal has a
(Continued)

plurality of ports which share the clock signal, the LED driving circuit can turn off modules as many as possible for a black screen, thereby reducing power consumption.

16 Claims, 4 Drawing Sheets

(58) Field of Classification Search
CPC ..... G09G 2300/026; G09G 2310/0275; G09G 2310/08; G09G 2370/08; G09G 2370/10
See application file for complete search history.

(56) References Cited

U.S. PATENT DOCUMENTS

| | | | |
|---|---|---|---|
| 2011/0285325 A1 | 11/2011 | Jheng et al. | |
| 2021/0150976 A1* | 5/2021 | Wei | G09G 3/2085 |
| 2022/0068210 A1 | 3/2022 | Liao et al. | |
| 2022/0375396 A1 | 11/2022 | Zhang et al. | |
| 2023/0230531 A1 | 7/2023 | Kong | |

FOREIGN PATENT DOCUMENTS

| | | | |
|---|---|---|---|
| CN | 201233711 | Y | 5/2009 |
| CN | 101516152 | A | 8/2009 |
| CN | 101969721 | A | 2/2011 |
| CN | 102163418 | A | 8/2011 |
| CN | 103996372 | A | 8/2014 |
| CN | 104505023 | A | 4/2015 |
| CN | 106448550 | A | 2/2017 |
| CN | 111833803 | A | 10/2020 |
| CN | 111836427 | A | 10/2020 |
| CN | 111933081 | A | 11/2020 |
| CN | 212541764 | U | 2/2021 |
| CN | 112802427 | A | 5/2021 |
| CN | 112802427 | B | 8/2021 |
| CN | 115866833 | A | 3/2023 |

OTHER PUBLICATIONS

First Office Action, including Search Report, for Chinese Patent Application No. 202110402096.4, dated May 25, 2021, 10 pages.

* cited by examiner

LED DRIVING CIRCUIT, LED DISPLAY SYSTEM AND DISPLAY CONTROL METHOD

CROSS-REFERENCE TO RELATED APPLICATIONS

The present application is a Section 371 National Stage Application of International Application No. PCT/CN2022/082999, filed on Mar. 25, 2022, which published as WO 2022/218129 A1, on Oct. 20, 2022, not in English, which claims priority Chinese patent application No. 2021104020964, filed on Apr. 14, 2021, entitled "LED DRIVING CIRCUIT, LED DISPLAY SYSTEM AND DISPLAY CONTROL METHOD", the disclosures of which are herein incorporated by reference in their entireties.

The present disclosure is a Section 371 National Stage application of International application NO. PCT/CN2022/082999, which is filed on Mar. 25, 2022 and published as WO/2022/218129 A1 on Oct. 20, 2022, and claims priority to a Chinese patent application filed on Apr. 14, 2021, application number 2021104020964, entitled "LED DRIVING CIRCUIT, LED DISPLAY SYSTEM AND DISPLAY CONTROL METHOD", the disclosure of which are herein incorporated by reference in their entirety, including specification, claims, attached drawings and abstract.

FIELD OF THE DISCLOSURE

The present disclosure relates to the technical field of an LED display, in particular to an LED driving circuit, an LED display system and a display control method.

DESCRIPTION OF THE RELATED ART

An LED display system is widely used for displaying text and images. The LED display system comprises a control terminal and an LED display screen. The LED display screen includes LED modules (also called unit boards) as main components, which correspond to various display areas of the LED display screen. The LED modules can be used individually, or can be cascaded into a group in order to extend display areas of the display screen.

The control terminal has a plurality of communication ports. In a case that the LED display screen includes a plurality of groups of cascaded LED modules, the control terminal can provide a plurality of data signals and a plurality of clock signals to control respective ones of the plurality of groups of cascaded LED modules. The cascaded LED modules are used to form an expandable display screen.

Each LED module includes an LED array and an LED driving circuit for driving the LED array. In an actual display status of LED display screen, a part of the image may be a black screen. That is, some LED lamps are in a non-luminous state. The driving terminals corresponding to the non-luminous LED lamps are turned off at this status. In a case that all of the LED arrays are driven by an LED driving circuit and in a non-luminous state, a conventional LED driving circuit will turn off constant current driving means to reduce power consumption. However, the LED driving circuit includes not only the constant current driving means, but also other means which still work. Especially, the LED driving circuit may have built-in means with large power consumption, such as PLL means. When the number of LED lamps in the black screen is large, an overall power consumption of the LED display screen is still very large.

SUMMARY OF THE DISCLOSURE

In view of the above problems, one object of the present disclosure is to provide an LED driving circuit, an LED display system and a display control method, wherein the LED driving circuit turns off its modules as many as possible for a black screen, in a case that the control terminal shares clock signals at its ports, which reduces power consumption of the LED driving circuit and the LED display system.

According to a first aspect of the present disclosure, there is provided a display control method for an LED display system. The LED display system comprises a plurality of groups of cascaded LED driving circuits, each of which comprises a plurality of LED driving circuits being cascaded with each other. The display control method comprises: receiving a data signal and a clock signal at each of the plurality of groups of cascaded LED driving circuits, wherein the data signal includes at least transmission identification and display data; controlling serial transmission of the clock signal in accordance with the transmission identification in the data signal.

Preferably, the display control method further comprises determining the transmission identification of a next display cycle in accordance with display data of a current display cycle and display data of the next display cycle.

Preferably, in a case that display data of the current display cycle and display data of the next display cycle are all 0, the transmission identification in the data signal of the next display cycle of a group of cascaded LED driving circuits is valid.

Preferably, in a case that the transmission identification in the data signal is valid, the LED driving circuits in the group turn off serial transmission of the clock signal.

Preferably, in a case that display data of the current display cycle and display data of the next display cycle are not all 0, the transmission identification in the data signal of the next display cycle of a group of cascaded LED driving circuits is invalid.

Preferably, in a case that the transmission identification in the data signal is invalid, the LED driving circuits in the group turn on serial transmission of the clock signal.

Preferably, the data signal further includes a start signal, wherein a data signal and a clock signal of the next display cycle are received in response to the start signal of the current display cycle.

According to another aspect of the present disclosure, there is provided an LED driving circuit comprising: a data input terminal for receiving a data signal which includes at least the transmission identification and display data; a data output terminal for transmitting the data signal from a LED driving circuit being cascaded after a current LED driving circuit to a next LED driving circuit; a clock input terminal for receiving a clock signal; a clock output terminal which turns on or off transmission of the clock signal to the next LED driving circuit in accordance with the transmission identification in the data signal.

Preferably, the LED driving circuit further comprises: a data processor which is coupled with the data input terminal and is used for receiving the transmission identification in the data signal, display data of the current LED driving circuit and display data of a LED driving circuit being cascaded after the current LED driving circuit; a display memory for storing display data of the current LED driving circuit; a driving means for generating a driving signal for driving an LED array in accordance with display data of the current LED driving circuit; an identification processor for generating a control signal in accordance with the transmission identification; a clock transmission means for turning on or off transmission of the clock signal to the next LED driving circuit in response to the control signal.

Preferably, the LED driving circuit further comprises a clock processor for generating an internal clock signal in accordance with the clock signal.

Preferably, the LED driving circuit further comprises a data forwarding means for forwarding the data signal from the LED driving circuit being cascaded after the current LED driving circuit to a next LED driving circuit in accordance with the internal clock signal.

Preferably, in a case that the transmission identification is valid, the control signal controls the clock transmission means to turn off transmission of the clock signal to the next LED driving circuit.

Preferably, in a case that the transmission identification is invalid, the control signal controls the clock transmission means to turn on transmission of the clock signal to the next LED driving circuit.

According to a third aspect of the present disclosure, there is provided an LED display system comprising: a control terminal and a plurality of groups of LED driving circuits being cascaded with each other, each of which a plurality of LED driving circuits as described above. The control terminal transmits data signals and clock signals to respective ones of the plurality of groups of cascaded LED driving circuits, and the data signals include at least transmission identification and display data. The plurality of groups of cascaded LED driving circuits control serial transmission of the clock signal in accordance with the transmission identification in the data signals.

Preferably, the control terminal determines the transmission identification of the next display cycle in accordance with display data of a current display cycle and display data of the next display cycle.

Preferably, in a case that display data of the current display cycle and display data of the next display cycle are all 0, the transmission identification of the next display cycle is valid.

Preferably, in a case that display data of the current display cycle and display data of the next display cycle are not all 0, the transmission identification of the next display cycle is invalid.

Preferably, a group of cascaded LED driving circuits turns off serial transmission of the clock signal when receiving valid the transmission identification in the data signal.

Preferably, a group of cascaded LED driving circuits turns on serial transmission of the clock signal when receiving invalid the transmission identification in the data signal.

Preferably, the data signal further includes a start signal, and the control terminal transmits a data signal and a clock signal of the next display cycle to a plurality of groups of cascaded LED driving circuits in response to the start signal of the current display cycle.

The LED driving circuit, the LED display system and the display control method according to embodiments of the present disclosure, introduce transmission identification into an original data signal. The transmission identification of a next display cycle is determined in accordance with display data of a current display cycle and display data of the next display cycle, and the disclosure can turn on or off transmission of a clock signal in the corresponding display cycle in accordance with the transmission identification. In a case that the control terminal has some ports which share a clock signal, the LED driving circuit can turn off its means as many as possible for a black screen, thereby reducing power consumption of the LED driving circuit and the LED display system.

BRIEF DESCRIPTION OF THE DRAWINGS

The above and other objects, features and advantages of the present disclosure will become more apparent from the following description of the embodiment according to the present disclosure with reference to the accompanying drawings, in which.

DETAILED DESCRIPTION OF EMBODIMENTS OF THE DISCLOSURE

Figure 1:
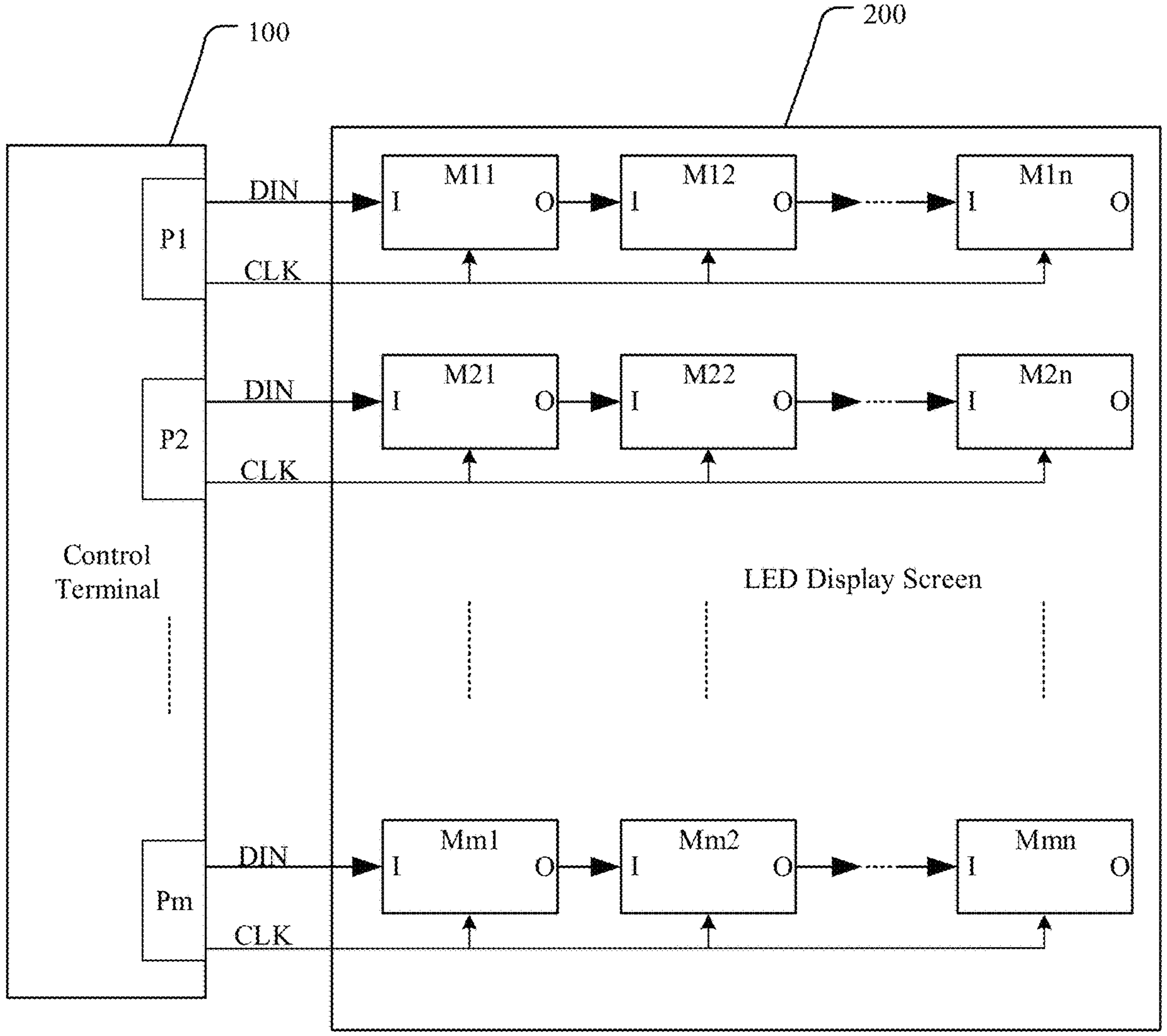
FIG. 1 shows a schematic structural diagram of a conventional LED display system.

Various embodiments of the present disclosure will be described in more detail below with reference to the accompanying drawings. Throughout the various figures, like elements are denoted by the same or similar reference numerals. For the sake of clarity, various parts in the drawings are not drawn to scale.

Specific embodiments of the present disclosure are described in further detail below, with reference to the accompanying drawings and the corresponding embodiments.

FIG. 1 shows a schematic block diagram of a conventional LED display system. The LED display system includes a control terminal 100 and an LED display screen 200, and the control terminal 100 has a plurality of ports (P1-Pm) which are coupled with the LED display screen 200. The LED display screen 200 includes a plurality of groups of cascaded LED modules, each of which includes a plurality of LED modules being cascaded. Each LED module includes an LED driving circuit and an LED array. A plurality of LED driving circuits in a plurality of cascaded LED modules are cascaded with each other to form a plurality of LED driving circuits being cascaded with each other.

The control terminal 100 may provide a plurality of data signals DIN and a plurality of control signals, for controlling the plurality of groups of cascaded LED modules of the LED display screen 200. That is, the control terminal 100 provides data signals DIN and control signals to respective ones of the plurality of groups of cascaded LED driving circuits. The control signal includes at least a clock signal CLK, and the data signal DIN includes at least display data.

A port Pi (where $1 \le i \le m$) of the control terminal 100 provides a data signal DIN and a control signal to a group of cascaded LED modules (Mi1-Min). The data signal DIN is transmitted in series to each cascaded LED module in the group of cascaded LED modules. The control signal is transmitted in parallel to each cascaded LED module in the group of cascaded LED module. That is, the data signal DIN is transmitted in series to each LED driving circuit in the group of cascaded LED driving circuits, and the control signal is transmitted in parallel to each LED driving circuit in the group of cascaded LED driving circuits.

Specifically, the port Pi provides the data signal DIN to a first LED module Mi1 in one of the plurality of groups of cascaded LED modules (Mi1-Min), and then the first LED module Mi1 transmits the data signal DIN to a next stage LED module Mi2, and so on. The port Pi provides the control signal in parallel to each LED module in the one of the plurality of groups of cascaded LED modules (Mi1-Min).

In a case that each port is configured with an individual clock signal, if the control terminal 100 detects at one port Pi that the LED modules (Mi1-Min) in a group of the cascaded LED modules, which are coupled with the one port Pi, have display data of all 0 in a next display cycle, the control terminal 100 stop to transmit a data signal DIN to the LED modules (Mi1-Min), and turn off a clock signal CLK at the one port Pi before the next display cycle. The LED modules (Mi1-Min) in the group of cascaded LED modules do not need to receive the display data of the next display cycle, and stop working in the next display cycle by turning off all function blocks. If the control terminal 100 continuously detects that the display data of the LED modules (Mi1-Min) in the group of cascaded LED modules is 0, it continuously turns off the clock signal CLK, until it detects that the display data of non 0 in a display cycle. The control terminal 100 transmits the data signal DIN and the clock signal CLK again to the LED modules (Mi1-Min) in the group of cascaded LED modules.

The control terminal 100 typically constitutes of a controller, such as FPGA. Because the controller has limited resources (including clock resources) but has many ports, it is impossible to provide an individual clock signal CLK for each port. Therefore, some ports of the many ports share a clock signal CLK, and thus it is impossible to close the clock signal CLK for a predetermined port.

Figure 2:
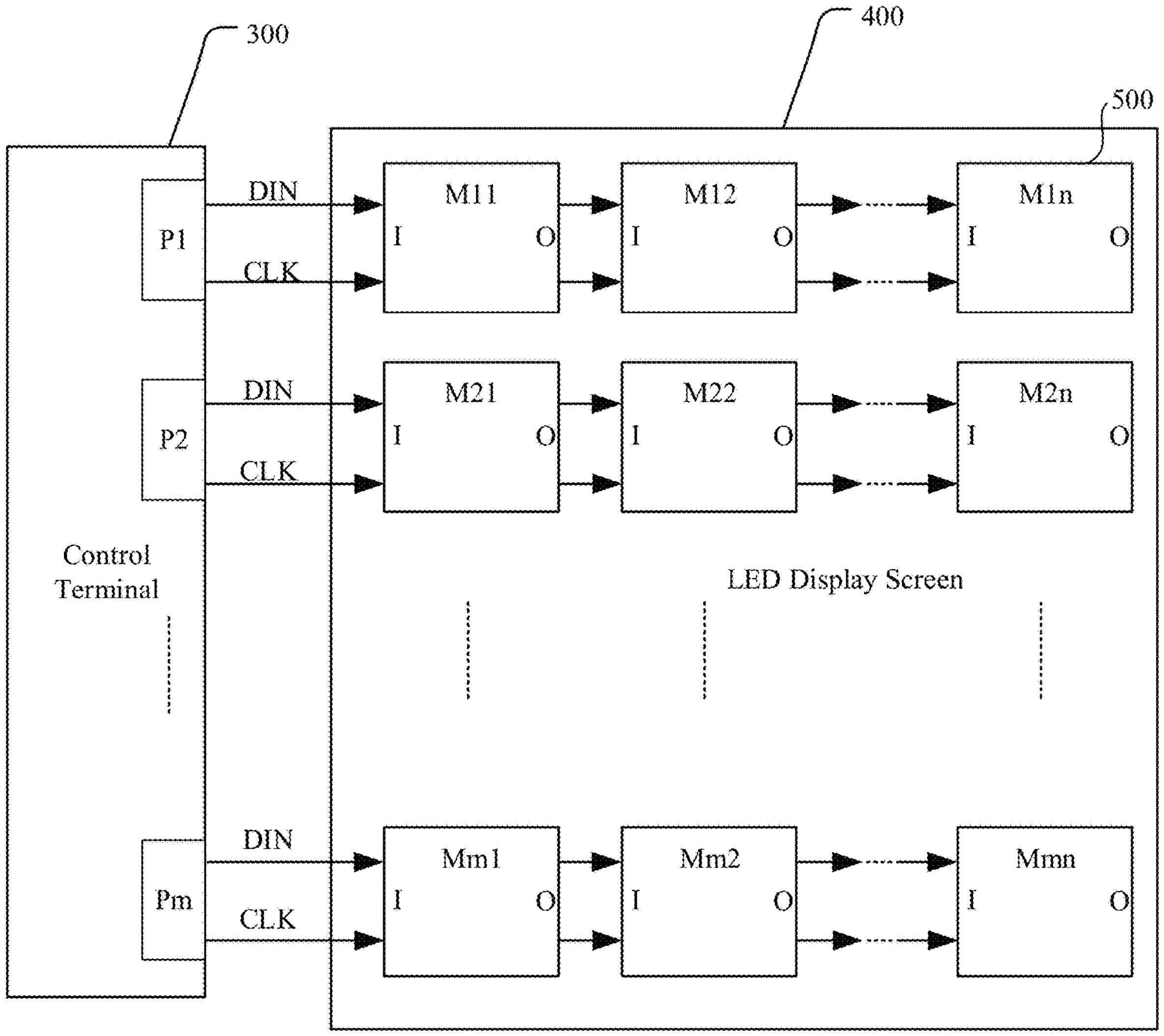
FIG. 2 shows a schematic structural diagram of another conventional LED display system.

FIG. 2 shows a schematic block diagram of another conventional LED display system. Compared with the LED display system shown in FIG. 1, both the data signal DIN and the clock signal CLK are transmitted in series.

No matter whether the clock signal CLK is transmitted in series or in parallel in a group of cascaded LED modules, as long as some ports of the control terminal share the clock signal CLK, the clock signals of these ports cannot be turned off independently.

Figure 3:
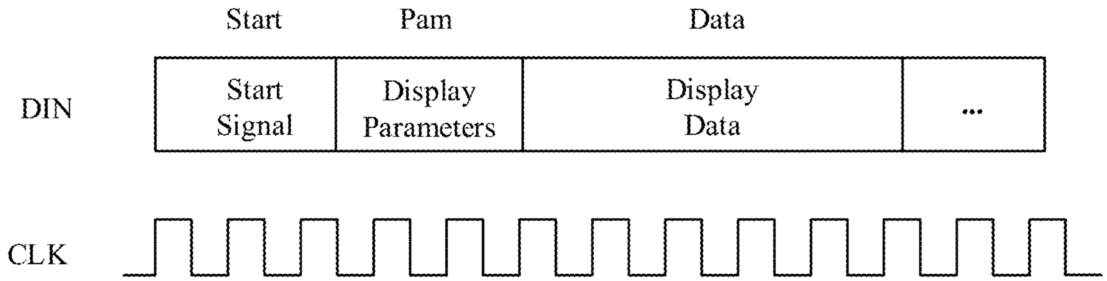
FIG. 3 shows a schematic diagram of a data structure of a data signal in a conventional LED display system.

FIG. 3 shows a schematic diagram of a data structure of a data signal in a conventional LED display system. As shown in FIG. 3, a control terminal in the prior art provides a data signal DIN to one of a plurality of groups of cascaded LED modules. The data signal DIN includes a start signal Start, display parameters Pam, and display data Data. After each display cycle starts, the control terminal transmits the display parameters Pam and display data Data of a next display cycle to the one of the plurality of groups of cascaded LED modules. Each of the plurality of groups of cascaded LED modules receives display data in each display cycle, waits for a next display cycle, switches the data and controls the display in response to the start signal Start.

The embodiment according to the present disclosure is applicable to the LED display system shown in FIG. 2. Both the data signal DIN and the clock signal CLK are transmitted in series. The embodiment according to the present disclosure realizes transmission control of the clock signal CLK by changing the data structure of the data signal DIN.

In this embodiment, the LED display system includes a control terminal 300 and an LED display screen 400. The control terminal 300 has a plurality of ports (P1-Pm) which are coupled to the LED display screen 400. The LED display screen 400 includes a plurality of groups of cascaded LED modules, each of which comprises a plurality of LED modules being cascaded. Each LED module includes an LED driving circuit and an LED array. A plurality of LED driving circuits in a plurality of cascaded LED modules are cascaded with each other to form a plurality of LED driving circuits being cascaded with each other.

The control terminal 300 can provide a plurality of set of serial data to control respective ones of the plurality of groups of cascaded LED modules of the LED display screen 400. That is, the control terminal 300 provides a data signal DIN and a control signal to one of the plurality of groups of cascaded LED driving circuits. The serial data includes a data signal DIN and a control signal. The control signal includes at least a clock signal CLK.

One of the ports Pi of the control terminal 300 provides a data signal DIN and a control signal to the one of the plurality of groups of cascaded LED modules (Mi1-Min). The data signal DIN is transmitted in series to each LED module in a group of cascaded LED modules, and the control signal is transmitted in series to each LED module in the group of cascaded LED modules.

Figure 4:
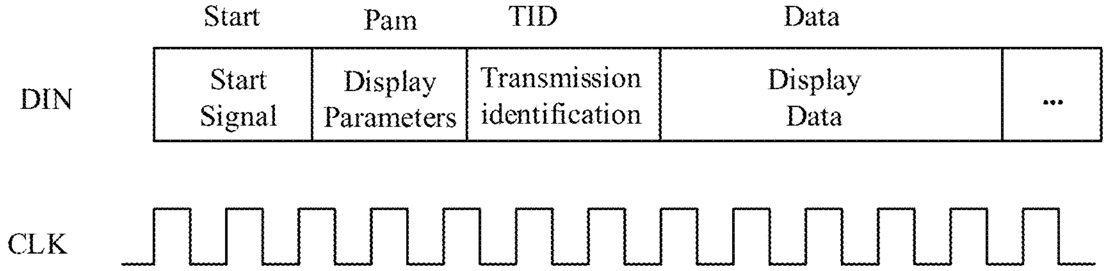
FIG. 4 shows a schematic diagram of a data structure of a data signal in an LED display system according to an embodiment of the present disclosure.

Referring to FIG. 4, the data signal DIN in the embodiment according to the present disclosure includes not only a start signal Start, display parameters Pam, and display data Data, but also transmission identification TID. Transmission identification TID is located between the display parameters Pam and the display data Data. The LED module starts display of a current display cycle in response to the start signal Start, and the control terminal 300 transmits a data signal DIN and a clock signal CLK of a next display cycle. The display parameters Pam are display-related parameters, such as a configuration of a circuit, and the like, which are independent of the display cycle.

The control terminal 300 transmits the data signal DIN of the next display cycle in response to the start signal Start of the current display cycle. Before transmitting the data signal DIN of the next display cycle, transmission identification TID of the next display cycle is set in accordance with display data Data of the current display cycle and display data Data of the next display cycle. In a case that the display data Data of the current display cycle and the display data Data of the next display cycle are all 0, transmission identification TID of the next display cycle is valid, for example, "TID=1" is valid. In a case that the display data Data of the current display cycle and the display data Data of the next display cycle are not all 0, transmission identification TID of the next display cycle is invalid, for example, "TID=0" is invalid.

When the LED display system is just powered on, transmission identification TID is invalid, and various ports of the control terminal 300 transmit data signals DIN and clock signals CLK to respective ones of a plurality of groups of cascaded LED modules, and the data signals DIN and the clock signals CLK are transmitted in series in respective ones of the plurality of groups of cascaded LED modules. That is, a data signal DIN and a clock signal CLK are transmitted in series in the one of the plurality of LED driving circuits being cascaded with each other.

When display data Data of a current display cycle are all 0, the control terminal further determines whether display data Data of a next display cycle are all 0 or not. If so, the control terminal modifies transmission identification TID of the next display cycle to be valid, so that the clock signal CLK cannot be transmitted in series in the one of the plurality of groups of cascaded LED modules. That is, the clock signal CLK cannot be transmitted in series in the LED driving circuits being cascaded with each other of the corresponding group. After transmission of a clock signal CLK in subsequent ones of the LED driving circuits being cascaded with each other are turned off, the subsequent ones of the LED driving circuits are turned off to reduce power consumption of the LED driving circuit and the LED display system.

Figure 5:
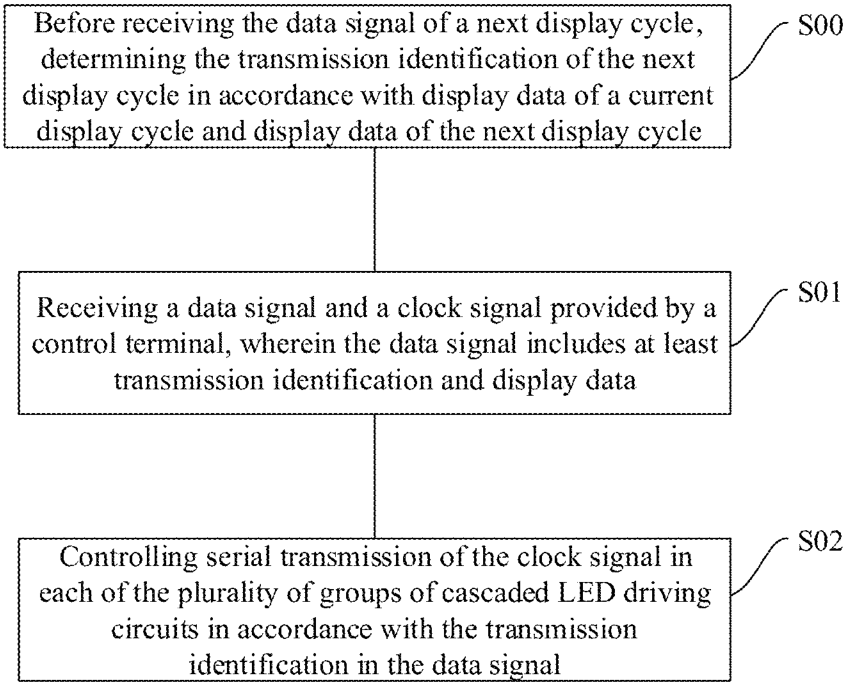
FIG. 5 shows a flowchart of a display control method for an LED display system according to an embodiment of the present disclosure.

FIG. 5 shows a flowchart of a display control method for an LED display system according to an embodiment according to the present disclosure. Referring to FIG. 5, the display control method includes the following steps.

In step S01, a data signal and a clock signal provided by a control terminal are received, wherein the data signal includes at least transmission identification and display data.

In this embodiment, the LED display system includes a control terminal 300 and a plurality of groups of cascaded LED driving circuits, each of which includes a plurality of LED driving circuits being cascaded with each other.

The data signal DIN includes not only a start signal Start, display parameters Pam, and display data Data, but also transmission identification TID. The transmission identification TID is located between the display parameters Pam and display data Data. The LED module starts display of a current display cycle in response to the start signal Start, and the control terminal 300 starts to transmit the data signal DIN and the clock signal CLK of a next display cycle. The display parameters Pam are display-related parameters, such as a configuration of a circuit and the like, which are independent of the display cycle. The control terminal 300 transmits the data signal DIN of the next display cycle in the current display cycle in response to the start signal Start of the current display cycle.

In step S02, serial transmission of the clock signal in each of the plurality of groups of cascaded LED driving circuits is controlled in accordance with the transmission identification in the data signal.

In this embodiment, in a case that display data of the current display cycle and display data of the next display cycle are all 0, transmission identification in the data signal of the next display cycle of a group of cascaded LED driving circuits is valid, and the LED driving circuits in the group turn off serial transmission of the clock signal. After turning off serial transmission of the clock signal CLK in subsequent ones of the LED driving circuits being cascaded with each other, the subsequent ones of the LED driving circuits are turned off to reduce power consumption of the LED driving circuit and the LED display system.

In a case that display data of the current display cycle and display data of the next display cycle are not all 0, transmission identification in the data signal of the next display cycle of a group of cascaded LED driving circuits is invalid, and the LED driving circuits in the group turn on serial transmission of the clock signal.

In a preferred embodiment, step S00 is also included before step S02. In step S00, transmission identification of a next display cycle is determined in accordance with display data of a current display cycle and display data of the next display cycle.

The control terminal 300 transmits the data signal DIN of the next display cycle in response to the start signal Start of the current display cycle. Before transmitting the data signal DIN of the next display cycle, transmission identification TID of the next display cycle is set in accordance with the display data Data of the current display cycle and the display data Data of the next display cycle. In a case that the display data Data of the current display cycle and the display data Data of the next display cycle are all 0, transmission identification TID of the next display cycle is valid, for example, "TID=1" is valid. In a case that the display data Data of the current display cycle and the display data Data of the next display cycle are not all 0, transmission identification TID of the next display cycle is invalid, for example, "TID=0" is invalid.

When the LED display system is just powered on, transmission identification TID is invalid, and various ports of the control terminal 300 transmit data signals DIN and clock signals CLK to respective ones of a plurality of groups of cascaded LED modules, and the data signals DIN and the clock signals CLK are transmitted in series in respective ones of the plurality of groups of cascaded LED modules. That is, a data signal DIN and a clock signal CLK are transmitted in series in the one of the plurality of LED driving circuits being cascaded with each other.

When display data Data of a current display cycle of LED driving circuit in a group of cascaded LED driving circuits are all 0, the control terminal further determines whether display data Data of a next display cycle are all 0 or not. If so, the control terminal modifies transmission identification TID of the next display cycle of the LED driving circuit in the group of cascaded LED driving circuits to be valid, so that the clock signal CLK cannot be transmitted in series in the one of the plurality of groups of cascaded LED modules. That is, the clock signal CLK cannot be transmitted in series in the LED driving circuits being cascaded with each other of the corresponding group. After transmission of a clock signal CLK in subsequent ones of the LED driving circuits being cascaded with each other are turned off, the subsequent ones of the LED driving circuits are turned off to reduce power consumption of the LED driving circuit and the LED display system.

Figure 6:
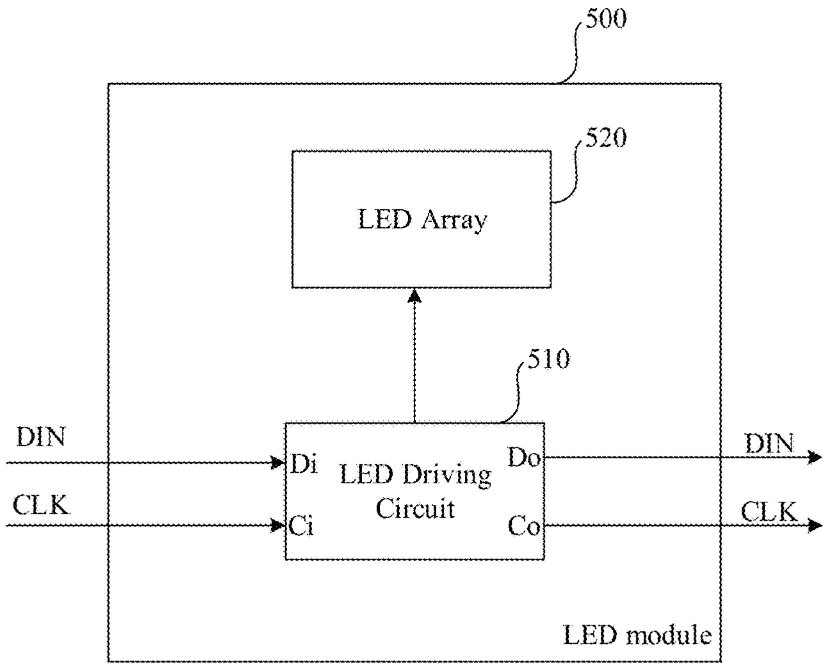
FIG. 6 shows a schematic diagram of a structure of an LED module according to an embodiment of the present disclosure.

FIG. 6 shows a schematic structural diagram of an LED module according to an embodiment of the present disclosure. As shown in FIG. 6, the LED Module 500 includes an LED driving circuit 510 for driving the LED array 520.

The LED driving circuit 510 receives the data signal DIN and the clock signal CLK.

In this embodiment, the data signal DIN has a plurality of fields, including not only a start signal Start, display parameters Pam and display data Data, but also transmission identification TID. The transmission identification TID is located between the display parameters Pam and the display data Data.

The LED driving circuit 510 turns on or off transmission of the clock signal CLK in accordance with the transmission identification TID.

Figure 7:
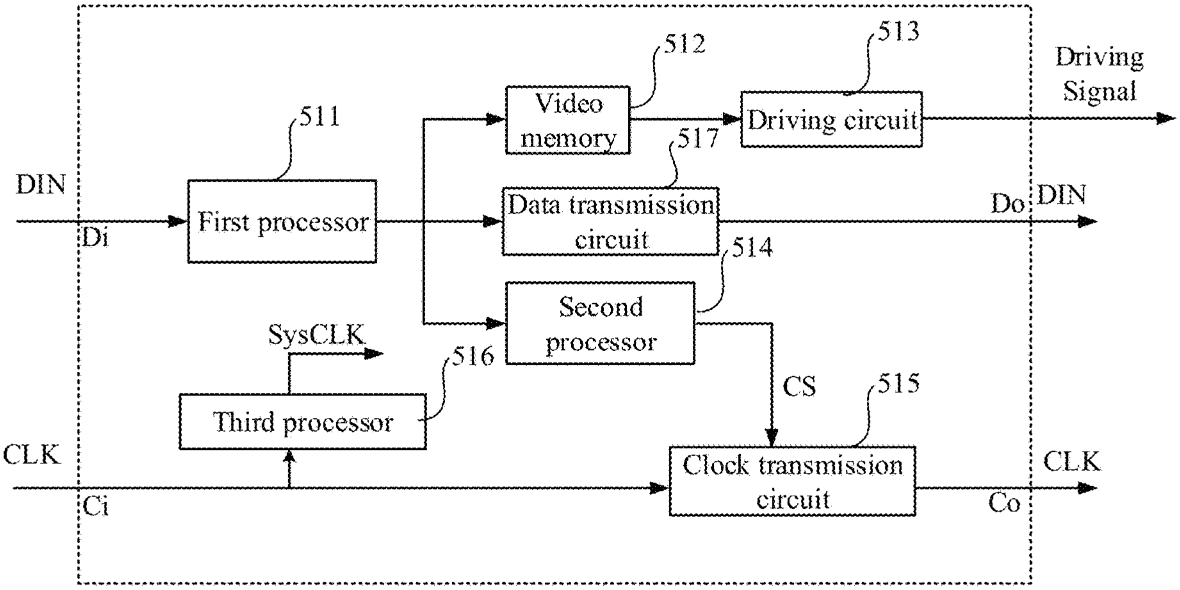
FIG. 7 shows a schematic diagram of a structure of an LED driving circuit according to an embodiment of the present disclosure.

FIG. 7 shows a schematic diagram of a structure of an LED driving circuit according to an embodiment of the present disclosure. Referring to FIG. 7, the LED driving circuit 510 includes a data input Di, a data output Do, a clock input Ci and a clock output Co.

A data input terminal Di of the LED driving circuit 510 is coupled with a data output terminal Do of a LED driving circuit for receiving the data signal DIN, wherein the data signal DIN includes at least transmission identification and display data Data.

In this embodiment, in a case that the LED driving circuit is a first-stage LED driving circuit, a data input terminal Di of the LED driving circuit is coupled to one port of the control terminal 300.

A data output terminal Do of the LED driving circuit 510 is coupled with a data input terminal Di of a next LED driving circuit, and is used for transmitting the data signal DIN of the LED driving circuit being cascaded after the current LED driving circuit to the next LED driving circuit.

In this embodiment, in a case that the LED driving circuit is the last stage LED driving circuit being cascaded, a data output terminal Do of the LED driving circuit is idle.

A clock input terminal Ci of the LED driving circuit 510 is coupled with a clock output terminal Co of a LED driving circuit and is used for receiving the clock signal CLK.

In this embodiment, in a case that the LED driving circuit is a first-stage LED driving circuit, a clock input terminal Ci of the LED driving circuit is coupled to one port of the control terminal 300.

A clock output terminal Co of the LED driving circuit 510 is coupled with a data input terminal Ci of the next LED driving circuit, and is used for turning on or off transmission of the clock signal CLK to the next LED driving circuit in accordance with the transmission identification TID in the data signal DIN.

In this embodiment, in a case that the LED driving circuit is the last stage LED driving circuit being cascaded, a clock output terminal Co of the LED driving circuit is idle.

The LED driving circuit 510 also includes a first processor 511, a video memory 512, a driving circuit 513, an second processor 514, and a clock transmission circuit 515.

The first processor 511 is coupled to a data input terminal Ci, and is used for receiving transmission identification TID in a current data signal DIN and for receiving display data Data of the current LED driving circuit and the LED driving circuits being cascaded thereafter. The display memory 512 buffers the display data of the current LED driving circuit 510. The driving circuit 513 is used for generating driving signals in accordance with the display data of the current LED driving circuit, and the driving signals are used for driving the LED array 520. The second processor 514 generates a control signal CS in accordance with the transmission identification TID. The clock transmission circuit 515 turns on or off transmission of the clock signal CLK to the next LED driving circuit in response to the control signal CS.

The control signal CS controls the clock transmission circuit 515 to turn off serial transmission of the clock signal CLK in a case that transmission identification TID is valid. After turning off serial transmission of the clock signal CLK in subsequent ones of the LED driving circuits being cascaded with each other, the subsequent ones of the LED driving circuits are turned off. In a case that transmission identification TID is invalid, the control signal CS controls the clock transmission circuit 515 to start serial transmission of the clock signal CLK.

In a preferred embodiment, the LED driving circuit 510 further includes a third processor 516 for generating an internal clock signal SysCLK on the basis of the clock signal CLK, and for providing the internal clock signal SysCL to other circuit of the LED driving circuit 510. The LED driving circuit 510 further includes a data transmission circuit 517 for forwarding the data signal DIN of a non-current LED driving circuit to the LED driving circuit of the next stage in accordance with the internal clock signal SysCLK.

The LED driving circuit, the LED display system and the display control method according to embodiments of the present disclosure, introduce transmission identification into an original data signal. The transmission identification of a next display cycle is determined in accordance with display data of a current display cycle and display data of the next display cycle, in a case that the control terminal has some ports which share a clock signal, the LED driving circuit can turn off its circuit as many as possible for a black screen, thereby reducing power consumption of the LED driving circuit and the LED display system.

The embodiments according to the present disclosure are described above, but the embodiments do not exhaust all the details and do not limit the disclosure to only the specific embodiments described. Obviously, according to the above description, many modifications and changes can be made. These embodiments are selected and specifically described in this specification in order to better explain the principles and practical disclosures of the present disclosure, thereby enabling those skilled in the art to make good use of the present disclosure and modifications based on the present disclosure. The present disclosure is limited only by the claims and their full scope and equivalents.

What is claimed is:

1. A display control method for an LED display system comprising a plurality of groups of cascaded LED driving circuits, each group of which comprises a plurality of LED driving circuits being cascaded, comprising:

receiving a data signal and a clock signal at each of the plurality of groups of cascaded LED driving circuits, wherein the data signal includes at least transmission identification and display data;

controlling serial transmission of the clock signal in each group of the plurality of groups of cascaded LED driving circuits in accordance with the transmission identification in the data signal;

wherein before receiving the data signal of a next display cycle, the display control method further comprises:

determining the transmission identification of the next display cycle in accordance with display data of a current display cycle and display data of the next display cycle, in a case that display data of the current display cycle and display data of the next display cycle are all 0, the transmission identification in the data signal of the next display cycle of a group of cascaded LED driving circuits is valid.

2. The display control method according to claim 1, wherein in a case that the transmission identification in the data signal is valid, the LED driving circuits in the group turn off serial transmission of the clock signal.

3. The display control method according to claim 1, wherein in a case that display data of the current display cycle and display data of the next display cycle are not all 0, the transmission identification in the data signal of the next display cycle of a group of cascaded LED driving circuits is invalid.

4. The display control method according to claim 3, wherein in a case that the transmission identification in the data signal is invalid, the LED driving circuits in the group turn on serial transmission of the clock signal.

5. The display control method according to claim 1, wherein the data signal further includes a start signal, wherein a data signal and a clock signal of the next display cycle are received in response to the start signal of the current display cycle.

6. An LED driving circuit comprising:

a data input terminal for receiving a data signal which includes at least transmission identification and display data;

a data output terminal for transmitting the data signal from a LED driving circuit being cascaded after a current LED driving circuit to a next LED driving circuit;

a clock input terminal for receiving a clock signal;

a clock transmission circuit which turns on or off transmission of the clock signal to the next LED driving circuit in accordance with the transmission identification in the data signal, wherein the transmission identification of a next display cycle is determined in accordance with display data of a current display cycle and display data of the next display cycle.

7. The LED driving circuit according to claim 6, further comprising:

a display memory for storing display data of the current LED driving circuit;

a driving circuit for generating a driving signal for driving an LED array in accordance with display data of the current LED driving circuit;

a clock transmission circuit for turning on or off transmission of the clock signal to the next LED driving circuit in response to a control signal.

8. The LED driving circuit according to claim 7, further comprising:

a data transmission circuit for forwarding the data signal from the LED driving circuit being cascaded after the current LED driving circuit to a next LED driving circuit in accordance with the internal clock signal.

9. The LED driving circuit according to claim 7, wherein in a case that the transmission identification is valid, the control signal controls the clock transmission means to turn off transmission of the clock signal to the next LED driving circuit.

10. The LED driving circuit according to claim 7, wherein in a case that the transmission identification is invalid, the control signal controls the clock transmission means to turn on transmission of the clock signal to the next LED driving circuit.

11. An LED display system comprising: a control terminal and a plurality of groups of cascaded LED driving circuits, each group of which comprises a plurality of LED driving circuits according to claim 7 and being cascaded;

the control terminal determines transmission identification of a next display cycle in accordance with display data of a current display cycle and display data of the next display cycle;

the control terminal transmits data signals and clock signals to respective ones of the plurality of groups of cascaded LED driving circuits, and the data signals include at least transmission identification and display data;

the plurality of groups of cascaded LED driving circuits control serial transmission of the clock signal in accordance with the transmission identification in the data signals.

12. The LED display system according to claim 11, wherein in a case that display data of the current display cycle and display data of the next display cycle are all 0, the transmission identification of the next display cycle is valid.

13. The LED display system according to claim 11, wherein in a case that display data of the current display cycle and display data of the next display cycle are not all 0, the transmission identification of the next display cycle is invalid.

14. The LED display system according to claim 13, wherein a group of cascaded LED driving circuits turns off serial transmission of the clock signal when receiving valid the transmission identification in the data signal.

15. The LED display system according to claim 14, wherein a group of cascaded LED driving circuits turns on serial transmission of the clock signal when receiving invalid the transmission identification in the data signal.

16. The LED display system according to claim 11, wherein the data signal further includes a start signal, and the control terminal transmits a data signal and a clock signal of the next display cycle to a plurality of groups of cascaded LED driving circuits in response to the start signal of the current display cycle.

* * * * *